United States Patent Office 3,174,928
Patented Mar. 23, 1965

3,174,928
PROCESS OF COAGULATING AND SEPARATION OF FINELY-DIVIDED SOLIDS IN AQUEOUS SUSPENSIONS
George T. Kekish, Chicago, Ill., assignor to Nalco Chemical Company, a corporation of Delaware
No Drawing. Filed May 22, 1958, Ser. No. 736,960
3 Claims. (Cl. 210—54)

This invention, in general, relates to processes for coagulating and thereafter separating of suspensions of finely-divided solids in water, especially those solids which are predominantly inorganic and, without coagulation thereof, normally remain suspended in water. More particularly, the invention relates to the coagulation and separation of suspensions of predominantly inorganic solids in water within the range of about 0.001% to about 5% by weight of the suspensions. Also, the invention relates to cationic condensation polymers of epichlorohydrin and ammonia, which polymers have pronounced coagulation activity with respect to inorganic solids found in low turbidity water.

Low turbidity waters, to which the instant invention is particularly applicable, are waters containing minor amounts of suspended solids, at least a part of which will remain suspended in the water even upon long, quiescent standing thereof. For this reason, it is often necessary to treat water obtained from natural sources to remove the suspended solids in order that the water be suitable for use in many applications such as municipal drinking waters and water used for industrial uses. Rivers, streams and lakes often contain suspended solids such as silt, clays and minor amounts of organic color bodies which are undesirable and are often difficult to remove by using inorganic coagulating chemicals such as alum, sodium aluminate, and/or lime. Large amounts of inorganic coagulants of the type previously described are generally employed in clarification of municipal drinking water. In some instances, excessive amounts of coagulant and/or long periods of settling time are required before clarification is achieved.

Naturally occurring water from many sources, and in some instances, brine and brackish waters are used in the recovery of petroleum by secondary water-flooding operations. Clarification of the water is necessary in many instances prior to water-flooding because the suspended impurities, particularly present in relatively large quantities, tend to plug the underground formations into which the waters are pumped. Also, naturally occurring waters used in such industrial operations as paper-making, petroleum refining, hydroelectric plants, atomic energy operations, metal plating, boiler plants, and the like, must be relatively free of suspended matter. The invention is also useful in the coagulation and settling of heavy suspensions containing up to about 25% by weight of predominantly inorganic solids, such as coal dust suspensions enountered in the processing of coal.

When using some coagulants now known to the art, there is often the problem of the supernatant liquid containing amounts of finely-divided suspended impurities which are harmful in some instances. These impurities are often residues from inorganic coagulants used to treat the system. It is desirable if a chemical treatment were afforded whereby such conditions were no longer prevalent.

One of the special problems with which the present invention is concerned is the improvement of floc size and settling in hot phosphate softening processes. In such processes waters containing hardness components, such as calcium and magnesium, are treated with phosphates to form insoluble calcium and magnesium phosphate salts which settle out and are separated. Orthophosphates, such as anhydrous disodium phosphate, are employed for this purpose. In this type of process, the precipitated inorganic solids are very finely divided with the result that coagulation and settling are relatively slow and it is difficult to produce a water free from turbidity. Various coagulation aids have heretofore been employed in an effort to improve floc size and settling, but many of the materials which function satisfactorily as coagulants in clarifying other types of turbid waters leave much to be desired, and in many cases are ineffective for practical purposes, when employed as coagulation aids in hot phosphate softening processes.

The expression "phosphate softening" as used herein refers to a process in which a water-soluble phosphate which forms insoluble calcium and magnesium salts is added to water containing calcium and/or magnesium salts in order to reduce the concentration of calcium and/or magnesium in the water by precipitation as an insoluble phosphate. Hot phosphate softening is frequently used as a primary softening in low hardness waters. It is often used as a secondary softening following lime soda softening of high hardness waters. The term "lime soda softening" includes those processes in which lime is employed either alone or in conjunction with minor amounts of soda ash or alkaline materials such as sodium aluminate for the treatment of water to separate the hardness components by precipitation. In the hot softening processes temperatures of 180° F. to 275° F. (under pressure) are frequently employed, the preferred temperatures being within the range of 212° F. to 240° F. Some types of chemicals which are useful in coagulation for other purposes tend to undergo chemical changes and are practically ineffective as coagulation aids in hot phosphate softening processes.

One of the objects of the present invention is to provide a new and improved method for coagulating and producing settling of finely-divided, predominantly inorganic solids from relatively dilute suspensions in water.

Another object of the invention is to provide a new and improved process for coagulating and producing settling of finely-divided solids which are predominantly inorganic and normally remain suspended in water in concentrations of 0.0015% to 25% by weight of the suspension.

A further object of the invention is to provide a process of treating suspensions of the type described in which relatively small amounts of added substances will produce a uniform floc and settling of the finely-divided solids without introducing into the liquid substances which have a harmful effect on industrial processes or cause harmful pollution of streams.

Yet another object is to provide a treatment which will produce a clear supernatant liquid free of residual finely-divided suspended impurities.

An additional object of the invention is to provide a process to increase floc size and settling rate in softening processes, especially in hot phosphate softening. Other objects will appear hereinafter.

In accordance with the invention, it has been found that coagulants of the type hereinafter described will produce coagulation and settling of finely-divided solids in low turbidity water, which solids are predominantly inorganic and normally remain suspended in water in concentrations of 0.001 to 5% by weight of the suspension, by treating such suspension with small amounts, based on weight of the total suspension, and generally less than about 10 parts per million and ordinarily greater than about 0.1 p.p.m., of a water-soluble, condensation product, preferably a polymer, obtained by the condensation of aqueous ammonia and epichlorohydrin at a molar ratio of approximately 0.66–6.0 mols of aqueous ammonia per mol of epichlorohydrin. In the most preferred practice of the invention, the ammonia-epichlorohydrin polymer employed in accordance with the invention is employed, in the coagulation and separation of solids in low turbidity water, in conjunction with another coagulant—for example, sodium aluminate, clays such as bentonite and preferably saponitic clay, aluminum sulfate or alum, iron sulfate, anionic water-soluble polymeric coagulant such as sodium polyacrylate, lime or a combination of any two or more of these auxiliary coagulants.

The ammonia-epichlorohydrin coagulants used in the practice of the invention are prepared by reacting aqueous ammonia at a molar ratio of about 0.66–6.0 mols of ammonia per mol of epichlorohydrin in the initial reaction mixture at a temperature between about 60° C. and 104° C. at atmospheric pressure for 0.5–24 hours—the higher the temperature, the shorter the reaction time, and vice versa. Preferably, the reaction is carried out under reflux. At reflux, the reaction time will ordinarily be in the range of 1–4 hours. The temperature of reaction may be as high as approximately 130° C. if the condensation is carried out above atmospheric pressure—the temperature of reaction being mainly limited by the necessity for preventing the boiling off of excessive amounts of ammonia.

In order to obtain effective results, the condensation must be carried out in the presence of water. Hence, aqueous ammonia solutions are eminently suitable for the reaction. The concentration of the aqueous ammonia may be varied between about 10% to 34% by weight. Commercial aqueous ammonia solutions containing about 28% by weight of ammonia, may be employed with good success in the production of the coagulants of the instant invention. With relatively high concentrations of ammonia, i.e., 28% ammonia solution, it is desirable to keep the ammonia to epichlorohydrin molar ratio at least 3:1 to avoid undesirable gelation of the condensate during production or storage. Products of lower mol ratios can be prepared from more dilute ammonia solutions. However, it is also possible to practice the invention by bubbling gaseous ammonia into an epichlorohydrin water mixture. The amount of water present should be sufficient so that the final product constitutes less than about 50% solids. The temperatures are those previously described.

Based on preliminary evaluations, it appears that the addition of aqueous ammonia to the epichlorohydrin is to be preferred over the reverse procedure in that the coagulation activity of the former product has been shown to be better than a product prepared by the addition of epichlorohydrin to aqueous ammonia under similar reaction conditions. The resulting product in all probabilty is a heterogeneous mixture of polymeric materials in all cases. The exact chemical structure of the resultant condensation polymers cannot be set forth with certainty, but it is known that the ammonia reacts with the epichlorohydrin at both the chlorine substituent and also the oxirane oxygen.

One of the advantages of the polymeric coagulants of the instant invention is that the resultant solution from the aqueous ammonia, epichlorohydrin condensation may be separated from the polymeric material by various means to obtain solid polymer, which solid polymer may be later dissolved and used as a coagulant with substantially the same activity as the original polymer solution. This permits the marketing of the coagulant polymer in dry solid form in bags, paper containers and the like instead of as aqueous solutions which require special handling techniques. For example, freezing of the aqueous solution is not a problem with a solid type material, settling of the coagulant polymer in the aqueous solution does not have to be reckoned with, the danger of corrosion of metal drums is not present, etc.

The production of the polymeric ammonia-epichlorohydrin condensate in dry form may be accomplished in one of several ways. The water of solution of the original condensate may be evaporated by first acidifying the solution with concentrated HCl or other inorganic acid to a pH in the range of about 1–5 with stirring and cooling—preferably keeping the temperature below 60° C. The acidified solution is then evaporated under vacuum at a temperature below 80° C. until the mixture becomes a cloudy white and relatively viscous, but still in a pourable state. A water-miscible alcohol in which the polymer is insoluble, such as isopropyl alcohol, is then added, the alcohol mixed with the viscous polymer and thereafter decanted. This procedure may be repeated one or more times if necessary to remove the water. The decanted polymer is then placed in a vacuum oven in thin layers and dried for one or more days. The dried, hard material is then ground into a powder—usually having a very slight yellowish tinge.

Instead of HCl, concentrated sulfuric acid may be used for the acidification. Instead of isopropyl alcohol, water-miscible solvents such as acetone, methanol, and the like may be used to remove the water after the initial evaporation. It is also possible to dry the acidified, evaporated, viscous polymer without going through the step of using water-miscible solvent for further dehydrating the polymer before drying in a vacuum oven. Further, spray drying may be used instead of vacuum oven drying—the viscous, polymeric condensate being pumped countercurrent to a current of hot, preferably inert gas. The resulting dried product will yield about 75–90% of theoretical as solid epichlorohydrin-ammonia condensate.

While epichlorohydrin-ammonia condensates exhibit coagulation activity over the broad molar range of reactants previously described, it has been found that the condensates exhibiting the best coagulation activity, measured in terms of the quantity of coagulant required to meet predetermined standards in testing procedures hereinafter described, fall within the range of about 3.0–6.0 mols of ammonia per mol of epichlorohydrin in the initial reaction mixture. In the most preferred form of the invention the molar ratio will be within the range of 4.0±0.2 mols of ammonia per mol of epichlorohydrin.

The invention previously described is illustrated in some preferred forms of the invention in the following examples, but the invention is not limited thereto.

EXAMPLE I

Epichlorohydrin and ammonia, as a 28% aqueous solution, were reacted in a 1:4 molar ratio respectively by adding the aqueous ammonia solution to the epichlorohydrin over a period of ten minutes with agitation at about room temperature. The reaction was exothermic—raising the temperature to 98° C. After all of the aqueous ammonia had been added, the mixture at atmospheric pressure was heated under reflux for three hours to a maximum and final temperature of 104° C. The resulting product was a clear, almost colorless liquid constituting 48% by weight solids in aqueous solution. The epichlorohydrin-ammonia condensate exhibited coagulation in low turbidity water in accordance with the tests reported below.

EXAMPLE II

A solid epichlorohydrin ammonia condensate is prepared by acidifying the 48% aqueous solution of Example I with concentrated HCl to bring the pH to approximately 2 with stirring and sufficient cooling to keep the temperature below 60° C. The acidified solution is evaporated under vacuum at a temperature of about 50° C. until the mixture becomes cloudy white and very viscous, yet pourable. The viscous mixture is then mixed with 3 volumes of isopropyl alcohol after which the alcohol is decanted. The isopropyl alcohol treatment is repeated. The condensate is then dried in a vacuum oven in shallow pans at about 60° C. for three days. The dried, hard condensate is removed from the pans and ground into powder form. It has a slight yellow tinge.

Coagulation evaluations

In order to evaluate the coagulation activity of compounds contemplated by the instant invention, a low turbidity water was prepared by mixing equal volumes of Chicago tap water and deionized water and then adding 20 p.p.m. of $CaCO_3$ and 100 p.p.m. of clay. The pH of the water was approximately 8. The clay added to the water was a very finely-divided clay which passed through 200 mesh screen. The turbidity of the test water, prior to coagulation of the suspended solids, is greater than 50 p.p.m. as $SiO_2$—the turbidity being measured on a Nalco turbidometer.

The coagulation tests were carried out in combination with 30 p.p.m. of saponitic clay to compare the ability of various ammonia-epichlorohydrin condensates to clarify the standard low turbidity water at various dosages. A blank run with only saponitic clay added gives a turbidity value approximately equal to the initial turbidity of the test water. The tests were carried out at room temperature, and the coagulants were mixed with the standard low turbidity water in beakers, and then the coagulated solids were permitted to settle. During the test, the floc size was observed, the settling rate evaluated and the sparkle and turbidity of the supernatant, clarified water was determined. The first three evaluations were made by visual observations, the latter by the use of a Nalco turbidometer. The following are results obtained in the settling tests:

TABLE I.—COAGULATION OF STANDARD LOW TURBIDITY WATER BY COMBINATIONS OF SAPONITIC CLAY (30 P.P.M.) AND AMMONIA-EPICHLOROHYDRIN COAGULANTS

The ammonia-epichlorohydrin in coagulants were prepared according to the technique outlined in Example I at the molar ratio indicated.

| Molar Ratio of $NH_3$:Epichlorohydrin | Conc. (p.p.m.) | Floc | Sparkle | Settling Rate | Turbidity (p.p.m. as $SiO_2$) |
|---|---|---|---|---|---|
| 4:1 | 0.2 | F | E | 2 | 3 |
|  | 0.4 | M | E | 3+ | 3 |
|  | 0.6 | ML | E | 4+ | 3 |
|  | 0.8 | ML+ | E | 5− | 3 |
|  | 1.0 | ML++ | E | 5− | 3 |
| 0.66:1.0 | 1.0 | VF | E | 2 | 3 |
|  | 2.0 | F | E | 2+ | 3 |
|  | 3.0 | M | E | 3 | 3 |
|  | 4.0 | ML− | E | 4 | 3 |
|  | 5.0 | ML | E | 5− | 3 |
| 3:1 | 0.2 | VF | E | 2 | 3 |
|  | 0.4 | FM | E | 3− | 3 |
|  | 0.6 | ML− | E | 5− | 3 |
|  | 0.8 | ML+ | E | 5 | 3 |
|  | 1.0 | L | E | 5+ | 3 |
| 5:1 | 0.5 | VF | E | 2− | 3 |
|  | 0.8 | FM | E | 3 | 3 |
|  | 1.0 | M− | E | 4− | 3 |
| 3.5:1 | 0.5 | FM | E | 3 | 3 |
|  | 0.8 | ML | E | 5− | 3 |
|  | 1.0 | ML+ | E | 5 | 3 |
| 4:1* | 0.2 | FM | E | 3 | 3 |
|  | 0.4 | ML− | E | 4+ | 3 |
|  | 0.6 | ML | E | 5− | 3 |
|  | 0.8 | ML+ | E | 5 | 3 |
|  | 1.0 | ML+ | E | 5 | 3 |

*Powdered, dried concentrate redissolved as 20% by weight solution.

The evaluations in the previou stable are reported as follows: The settling rates are reported on a numerical basis of 1, 2, 3, 4, or 5, the largest figures indicating the most rapid settling rates. A turbidity value of less than 3 is considered to be an acceptable standard. The floc size values are as follows:

VF—very fine
FM—fine-medium
M—medium
ML—medium-large
L—large

For purposes of convenience in handling the floc particles in large scale water treatment, a medium or medium large floc particle size is considered to be the most desirable. Very fine, fine and fine-medium sizes are considered to be below standard, the latter being borderline. A large particle size is acceptable, though less preferred to medium or medium-large particles.

The instant invention thus provides coagulants which exhibit good coagulation activity in aqueous suspensions of predominantly inorganic solids, particularly low turbidity waters. One chief advantage of the invention is that the condensates herein contemplated can be manufactured from readily available chemicals at relatively small cost. Another important advantage is that, with the preferred embodiments of the invention, coagulation of suspended solids in water can be achieved at relatively small concentrations of the condensate. Other advantages have been set forth previously.

The invention is hereby claimed as follows:

1. A process for clarifying water having inorganic particles suspended therein which comprises intimately mixing with low turbidity water a small quantity, sufficient to coagulate said particles, of a cationic polymer having coagulation activity in low turbidity water comprising an ammonia-epichlorohydrin condensation polymer prepared by refluxing aqueous ammonia and epichlorohydrin at a molar ratio of about three to six mols of ammonia per mol of epichlorohydrin for 1–4 hours, and separating the water from the coagulated particles.

2. The process of claim 1 wherein said polymer is used in conjunction with an inorganic coagulant aid.

3. The process of claim 2 wherein said coagulant aid is saponitic clay.

References Cited in the file of this patent

UNITED STATES PATENTS

| | | |
|---|---|---|
| 1,977,251 | Stallman | Oct. 16, 1934 |
| 2,420,340 | Ryzner | May 13, 1947 |
| 2,601,597 | Daniel et al. | June 24, 1952 |
| 2,817,649 | Contois | Dec. 24, 1957 |

FOREIGN PATENTS

| | | |
|---|---|---|
| 154,799 | Australia | Jan. 19, 1954 |

OTHER REFERENCES

Hagen: "Chem. Eng.," June 1956, page 148.